(12) United States Patent
MacMillian et al.

(10) Patent No.: US 10,738,838 B2
(45) Date of Patent: Aug. 11, 2020

(54) FRICTIONAL PIECE

(71) Applicant: Schaeffler Technologies AG & Co. KG, Herzogenaurach (DE)

(72) Inventors: Loyal George MacMillian, Karlsruhe (DE); Tobias Bauer, Achern (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 63 days.

(21) Appl. No.: 16/070,372

(22) PCT Filed: Jan. 10, 2017

(86) PCT No.: PCT/DE2017/100012
§ 371 (c)(1),
(2) Date: Jul. 16, 2018

(87) PCT Pub. No.: WO2017/133721
PCT Pub. Date: Aug. 10, 2017

(65) Prior Publication Data
US 2019/0017555 A1    Jan. 17, 2019

(30) Foreign Application Priority Data
Feb. 2, 2016   (DE) .................. 10 2016 201 508

(51) Int. Cl.
*F16D 13/64*   (2006.01)
*F16D 13/72*   (2006.01)
*F16D 69/00*   (2006.01)

(52) U.S. Cl.
CPC .......... *F16D 13/648* (2013.01); *F16D 13/72* (2013.01); *F16D 69/00* (2013.01); *F16D 2069/004* (2013.01)

(58) Field of Classification Search
CPC ........ F16D 13/648; F16D 69/00; F16D 13/72; F16D 2069/004
See application file for complete search history.

(56) References Cited

U.S. PATENT DOCUMENTS

| | | | | |
|---|---|---|---|---|
| 3,786,904 | A | * | 1/1974 | Hotchkiss ............. F16D 13/648 192/107 R |
| 5,857,552 | A | * | 1/1999 | Hashimoto ....... F16F 15/12313 192/212 |
| 8,157,071 | B2 | * | 4/2012 | Mordukhovich ....... F16D 13/64 192/107 C |

(Continued)

FOREIGN PATENT DOCUMENTS

| | | |
|---|---|---|
| CN | 102162493 A | 8/2011 |
| CN | 102848080 A | 1/2013 |

(Continued)

*Primary Examiner* — David J Hlavka
(74) *Attorney, Agent, or Firm* — Kevin L. Parks

(57) ABSTRACT

A frictional piece for a wet frictionally engaging device includes an axis of rotation, a lining support, a pair of friction linings, and a plurality of through holes. The lining support is rotatable about the axis of rotation. The pair of friction linings is mounted on the lining support. The friction linings include respective frictional surfaces that face away from each other. The plurality of through holes extends through the friction linings and the lining support between the frictional surfaces. The frictional piece also includes a plurality of channels each fluidically connecting at least two of the plurality of through holes.

20 Claims, 4 Drawing Sheets

(56) References Cited

U.S. PATENT DOCUMENTS

| | | | | |
|---|---|---|---|---|
| 9,702,413 B2* | 7/2017 | Bibby | ............... | F16F 15/00 |
| 2007/0017769 A1* | 1/2007 | Mordukhovich | ..... | F16D 13/648 |
| | | | | 192/70.12 |
| 2008/0073171 A1 | 3/2008 | Mordukhovich | | |
| 2013/0112515 A1* | 5/2013 | Shinagawa | ............. | F16D 65/12 |
| | | | | 188/218 XL |
| 2014/0326573 A1* | 11/2014 | Luipold | ................ | F16D 13/648 |
| | | | | 192/107 M |
| 2019/0017555 A1* | 1/2019 | MacMillian | .......... | F16D 13/648 |

FOREIGN PATENT DOCUMENTS

| | | |
|---|---|---|
| CN | 204403214 U | 6/2014 |
| CN | 104832557 A | 8/2015 |
| DE | 19626688 B4 | 1/1997 |
| DE | 102010054253 A1 | 6/2011 |
| DE | 102011106009 A1 | 1/2013 |
| EP | 0370476 A1 | 5/1990 |
| EP | 0947720 A2 | 10/1999 |
| EP | 1473478 A1 | 11/2004 |
| JP | H08200394 A | 8/1996 |

\* cited by examiner

FRICTIONAL PIECE

CROSS-REFERENCE TO RELATED APPLICATIONS

This application is the United States National Phase of PCT Appln. No. PCT/DE2017/100012 filed Jan. 10, 2017, which claims priority to German Application No. DE102016201508.7 filed Feb. 2, 2016, the entire disclosures of which are incorporated by reference herein.

TECHNICAL FIELD

The disclosure relates to a frictional piece for a wet frictionally engaging device, having a lining support, which is rotatable about an axis of rotation and on which friction linings are mounted, the friction linings representing frictional surfaces that face away from each other. The disclosure also relates to a method for producing a frictional piece of this kind.

BACKGROUND

European Laid-Open Application EP 1 473 478 A1 discloses a friction lining for a friction plate of a torque transmission unit, having at least one through slot, which forms a self-contained connection or which produces a through connection between an outer and/or an inner edge. At least one connecting slot is provided which does not form a self-contained connection and in which a through connection between the outer and/or the inner edge is produced via at least one through slot. German Patent DE 196 26 688 B4 discloses a friction lining for clutch disks which is of substantially circular-ring-shaped configuration and includes a substantially circular-ring-shaped support element and a friction lining layer of friction material mounted thereon. The friction lining has receiving regions or forming regions for the fastening of the friction lining, e.g. on a spring segment or on a driver or counterdisk of a clutch disk. Openings with raised edge regions of the openings are introduced into the support element in the radial region between the inside diameter and the outside diameter of the friction lining. German Laid-Open Application DE 10 2010 054 253 A1 discloses a wet friction clutch having at least one friction lining, which is arranged on a friction lining support and which, at least on one frictional surface, can be pressed against an associated friction partner and has coolant-carrying depressions on the frictional surface to cool the friction lining. At least one channel which can be opened by wear-induced abrasion on the frictional surface in order to admit coolant or a depression which can be opened by wear-induced abrasion on the frictional surface in order to admit coolant is provided in order to cool the friction lining.

BRIEF SUMMARY

Example aspects broadly comprise a frictional piece for a wet frictionally engaging device, having a lining support, which is rotatable about an axis of rotation and on which friction linings are mounted, the friction linings representing frictional surfaces that face away from each other, by virtue of the fact that the frictional piece has through holes, which extend through the friction linings and the lining support, between the frictional surfaces facing away from each other. A fluid connection between the frictional surfaces facing away from each other is thereby created in a simple manner. It is advantageous if at least one of the through holes is arranged radially on the inside in a fluid inlet region. During the operation of the wet frictionally engaging device, a fluid, in particular a cooling medium, such as oil, is supplied to the frictional piece, in particular radially on the inside, the cooling medium serving principally to cool the frictionally engaging device during operation. By means of the fluid, heat arising during the operation of the frictionally engaging device can be dissipated. The through holes enable the cooling fluid to dissipate heat from the frictional surfaces in a simple and particularly effective manner. The through holes also ensure uniform distribution of the fluid. This uniform distribution of the fluid has a positive effect on the tribological properties of the friction system. Here, the fluid is conveyed through the through holes more in a random way or is affected by many parameters, e.g. rotational speed, air path, contact force, temperature and geometry. In this case, the through holes ensure that a larger quantity of fluid is supplied in proximity to the frictional surface. This additional fluid is conducive to an increased heat capacity. Moreover, the through holes allow uniform fluid distribution within the frictionally engaging device. The uniform fluid distribution promotes a uniform temperature distribution. This is attributable especially to the fact that the heat can be transferred directly between the frictional surfaces facing away from one another via the through holes. Moreover, the frictional piece having the through holes provides the advantage that it can be produced in a particularly simple and low-cost way. On the one hand, the friction linings can each be embodied in an integral manner. Furthermore, the through holes can be produced in a particularly advantageous way by punching, for example. According to one illustrative embodiment, the frictional surfaces face away from each other in the axial direction.

An example illustrative embodiment of the frictional piece is characterized in that the frictional piece has channels, which are each connected fluidically to each other by at least two through holes. A fluid connection between the through holes is thereby created in a simple manner. As a result, the cooling effect can be improved even further. Moreover, the channels allow pressure equalization during clutch actuation. Complete closure of the associated clutch is thereby ensured in a simple manner.

Another example illustrative embodiment of the frictional piece is characterized in that the channels are formed at least in part by grooves which are provided in at least one of the friction linings. The grooves are provided in the frictional surfaces and allow a fluid connection between the through holes in a simple manner.

Another example illustrative embodiment of the frictional piece is characterized in that the channels are formed at least in part by grooves which are provided in the lining support. A fluid connection between the through holes is thereby likewise made possible in a simple manner. The grooves are preferably produced in the lining support before the friction linings are mounted on the lining support.

Another example illustrative embodiment of the frictional piece is characterized in that at least one through hole is connected to a fluid inlet or to a fluid outlet. The connection between the fluid inlet and the through hole allows fluid to enter. The connection between the through hole and the fluid outlet allows fluid to exit. The connections can be formed by a through hole itself, if this hole is open toward the fluid inlet or fluid outlet, for example. As an alternative or in addition, the connections between the respective through hole and the fluid inlet or fluid outlet can also be formed by corresponding channels. The channels are embodied as grooves, for example.

Another example illustrative embodiment of the frictional piece is characterized in that the through holes are distributed uniformly over the frictional surface. The cooling effect is thereby improved further.

Another example illustrative embodiment of the frictional piece is characterized in that the through holes extend in axial directions through the friction linings and the lining support. Particularly rapid heat transfer between the frictional surfaces facing away from each other is thereby made possible.

Another example illustrative embodiment of the frictional piece is characterized in that the friction linings have substantially the shape of circular-ring disks. The integral embodiment of the friction linings simplifies the production, especially the mounting, of the friction linings on the lining support. The friction linings are embodied as paper linings. The friction linings are secured on the lining support by adhesive bonding, for example.

In a method for producing a frictional piece described above, the friction linings are mounted on the lining support before the through holes are produced. This considerably simplifies the production of the frictional piece.

An example illustrative embodiment of the method is achieved by producing the through holes by punching. The through holes can be produced in the frictional piece at particularly low cost by punching. The through holes can have a circular cross section. However, it is also possible for the through holes to have other cross sections, e.g. polygonal cross sections. Thus, for example, the through holes can have a cross section in the form of a triangle or of a rectangle.

Another example illustrative embodiment of the method is achieved by producing the grooves by pressing or stamping. The grooves can be produced on the finished frictional piece. If appropriate, the grooves can also be produced before the through holes are produced. If appropriate, the grooves can also be produced in the friction linings before the friction linings are mounted on the lining support.

The disclosure also optionally relates to a clutch, in particular a wet clutch, having at least one frictional piece described above. According to another aspect, the disclosure relates to a wet multiplate clutch having frictional pieces described above.

BRIEF DESCRIPTION OF THE DRAWINGS

Further advantages, features and details of the disclosure will become apparent from the following description, in which various illustrative embodiments are described in detail with reference to the drawing, in which.

DETAILED DESCRIPTION

Figure 1:
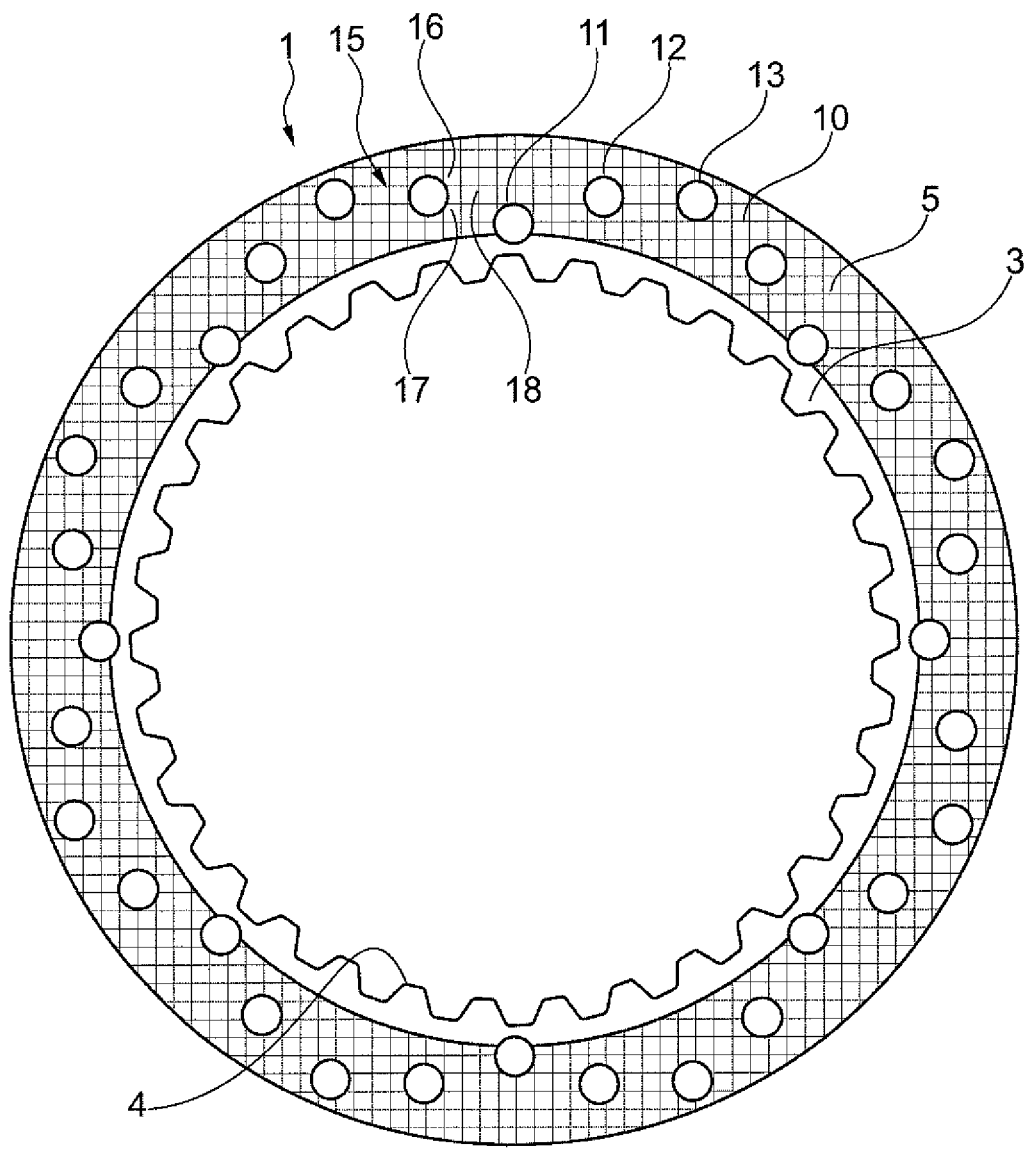
FIG. 1 shows a frictional piece in accordance with a first illustrative embodiment in plan view.
Figure 2:
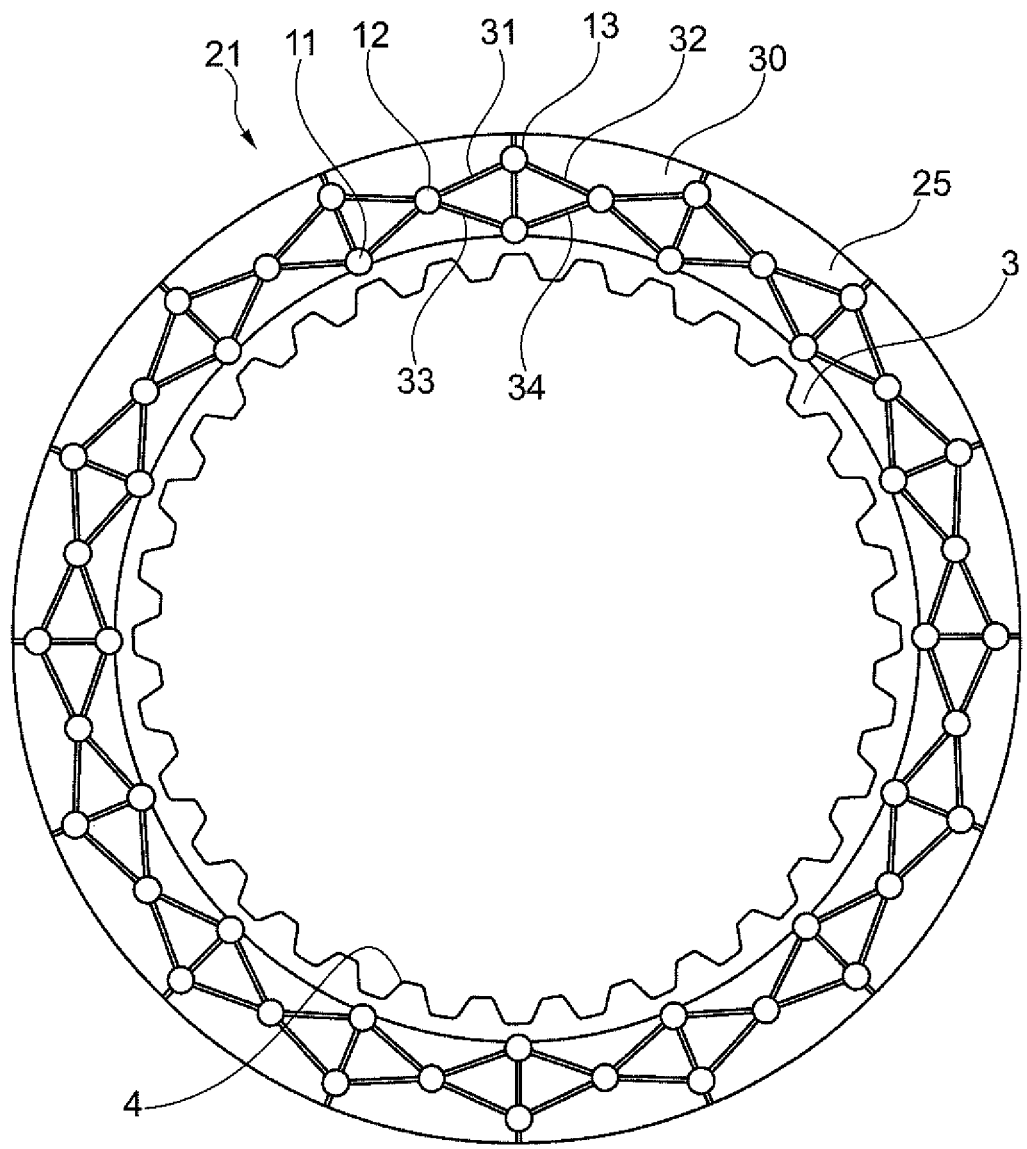
FIG. 2 shows a frictional piece similar to that in FIG. 1 in accordance with a second illustrative embodiment in plan view.
Figure 3:
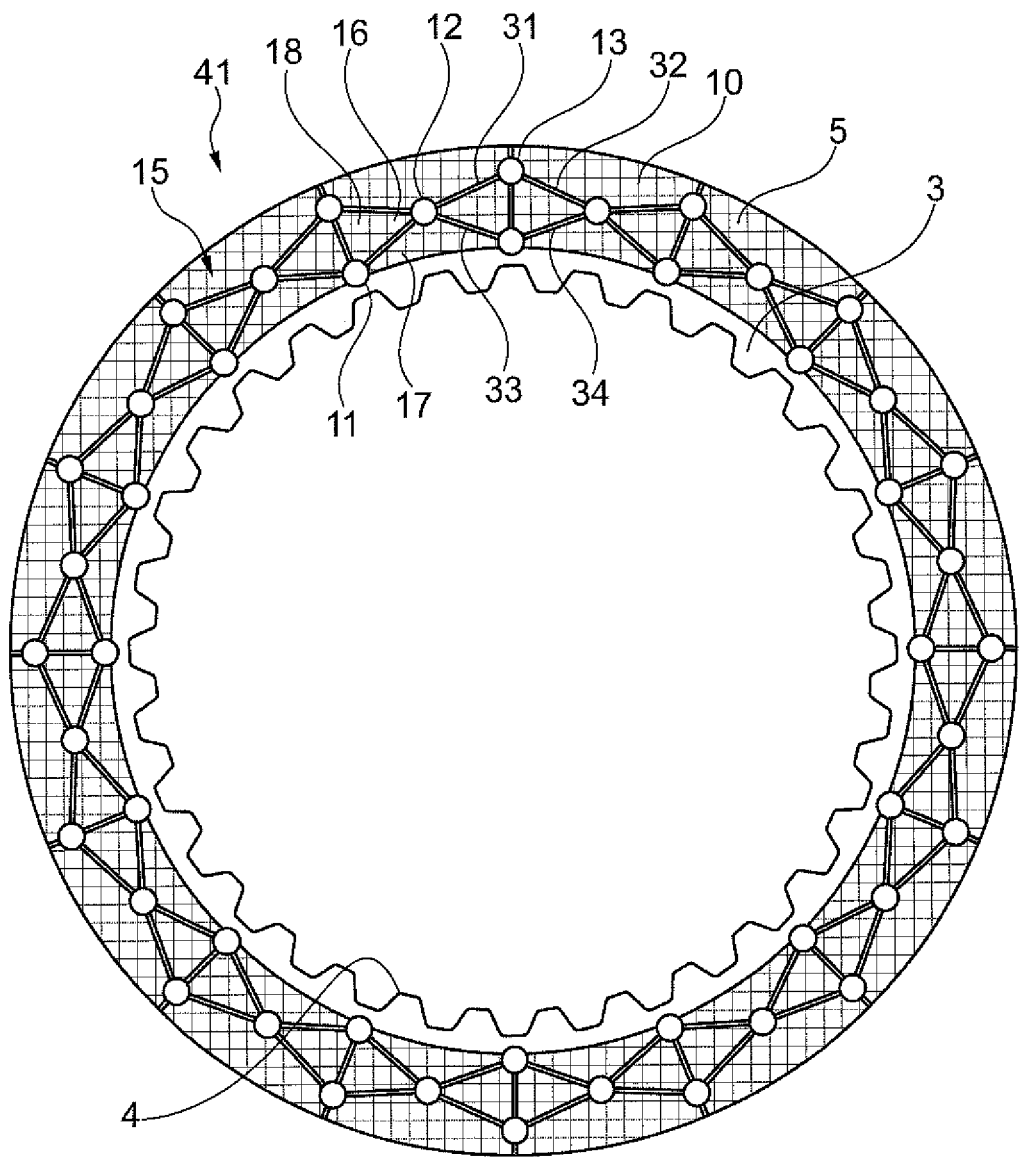
FIG. 3 shows a frictional piece in plan view, in which properties of the frictional pieces in FIGS. 1 and 2 are combined with one another.

In FIGS. 1 to 3, three illustrative embodiments of a frictional piece 1; 21; 41 are shown in plan view. The three illustrative embodiments of the frictional pieces 1; 21; 41 relate to multiplate clutches having friction plates, which are also referred to as frictional pieces.

The frictional pieces in FIGS. 1 to 3 are embodied as inner plates. The inner plates have substantially the shape of circular-ring disks with rectangular ring cross sections.

The inner plates are combined in a multiplate pack with outer plates, which are embodied as steel plates, for example. A multiplate pack with inner plates and outer plates is used to form a wet multiplate clutch.

The frictional pieces or inner plates 1; 21; 41 each include a lining support 3, which is also referred to as a support element and on which two friction linings 5; 25 are preferably mounted in each case. The lining supports 3 are formed from steel material, for example. Depending on the embodiment, the lining supports or support elements 3 are also referred to as support plates.

The friction linings 5; 25 are preferably formed from a suitable lining material and are used to form a frictional surface 10; 30. The frictional surfaces 10; 30 of the friction linings 5; 25 of the frictional pieces 1; 21 can be brought into contact with outer plates (not shown in FIGS. 1 to 3). For this purpose, an inner plate 1; 21; 41 is in each case arranged between two outer plates in an axial direction.

The term "axial" relates to an axis of rotation of a multiplate pack. "Axial" means in the direction of or parallel to the axis of rotation. Similarly, "radial" means transversely to the axis of rotation.

Radially on the inside, the lining supports 3 have internal toothing 4. The internal toothing 4 is used to form a coupling region. By means of the coupling region, the lining supports 3 can be connected for conjoint rotation to a plate support of the multiplate clutch. The internal toothing 4 is used to fit the respective friction lining support or lining support 3 into a corresponding plate support.

The frictional pieces 1; 21; 41 in FIGS. 1 to 3 each include a multiplicity of through holes 11, 12, 13, which extend both through the friction linings 5; 25 and through the lining supports 3. The through holes 11 to 13 are distributed uniformly over the respective frictional surface 10; 30. The number and size of the through holes 11, 12, 13 can vary according to the use.

In this case, through holes 11 arranged radially on the inside are arranged in a fluid entry region. The fluid entry region is associated with a fluid feed in the plate support (not shown). This is a simple way of ensuring that fluid for cooling gets into the through holes 11 arranged radially on the inside during the operation of the multiplate clutch.

On the one hand, the through holes 11 to 13 create fluid connections between frictional surfaces 10; 30 of the frictional pieces 1; 21; 41 which face away from each other. Moreover, the through holes 11 to 13 are connected fluidically to each other. As a result, heat transfer between hot or warm parts at different temperatures is considerably improved during the operation of the multiplate clutch.

It is important here that the through holes 11 to 13 are not only connected fluidically to each other but also to a fluid inlet and to a fluid outlet. This fluidic connection can be formed by corresponding channels, in particular grooves, for example. However, this fluidic connection can also be formed by the corresponding through holes, e.g. through hole 11 in FIG. 1, being open toward the fluid inlet and fluid outlet. For example, the fluid enters radially on the inside and exits radially on the outside. By means of these fluidic connections, hydrodynamic problems are reduced or prevented.

Moreover, the through holes 11 to 13 improve disengagement or opening of the multiplate clutch. As a result, in turn, a drag torque, which is unwanted during the operation of the multiplate clutch, is reduced.

Moreover, the frictional pieces 1; 21; 41 having the through holes 11 to 13 are relatively simple to produce. In the production of the frictional pieces 1; 21; 41, the friction linings 5; 25 are first of all mounted on the lining supports 3. The friction linings 5; 25 are embodied as paper linings.

After this, the through holes 11 to 13 are introduced into the frictional pieces 1; 21; 41, e.g. by drilling. However, it is particularly advantageous if the through holes 11 to 13 in the frictional pieces 1; 21; 41 are produced by punching. In this case, both the friction linings 5; 25 and the lining supports 3 are pierced during punching.

In the case of the frictional piece 1 illustrated in FIG. 1, the frictional surface 10 of the friction lining 5 is provided with a stamped pattern 15. The stamped pattern 15 includes a multiplicity of grooves 16, 17, 18. The grooves 16 to 18 are arranged crosswise and are distributed over the entire frictional surface 10.

The grooves 16 to 18 serve to form channels, which connect individual through holes 11, 12 fluidically to each other. The grooves 16 to 18 are introduced into the friction linings 5 by pressing or stamping. By virtue of the stamped pattern 15 including the grooves 16 to 18, almost all the through holes 11 to 13 are connected fluidically to each other.

The through holes 11 to 13 ensure, on the one hand, that a fluid, in particular a cooling medium, remains for a sufficiently long time in the interior of the multiplate clutch to ensure high heat transfer. This is a simple way of ensuring that the individual frictional pieces 1; 21; 41 of the multiplate clutch can be effectively cooled even in frictional engagement with steel plates.

Moreover, the through holes 11 to 13 facilitate the exit of the heated fluid from the multiplate clutch. It is thereby possible to prevent unwanted parasitic viscosity losses. This, in turn, has a positive effect on the avoidance of unwanted drag torques.

At the same time, the through holes 11 to 13 form a relatively large volume, which, in turn, represents a thermal mass or heat sink, thereby improving the cooling function.

The positive effects described above are achieved, on the one hand, by virtue of the fact that the through holes 11 to 13 allow heat transfer between the two frictional surfaces of the frictional pieces 1; 21; 41 which face away from each other. In addition, the through holes 11 to 13 increase the volume and also the time which is used to retain or to receive the fluid.

In the case of the frictional piece 21 illustrated in FIG. 2, a friction lining 25 having a flat frictional surface 30, i.e. without stamping or grooves, is mounted on the lining support 3. The through holes 11 to 13 extend both through the friction lining 25 and through the lining support 3.

Channels 31 to 34 are used to connect the through holes 11 to 13 to each other. The channels 31 to 34 are not visible per se in the plan view shown in FIG. 2. The channels 31 to 34 are formed by grooves, which are introduced into the lining support 3. The channels 31 to 34 each connect two of the through holes 11 to 13 to each other.

Alternatively or in addition, grooves can be introduced into a surface of the friction lining 25 which faces the lining support 3. The grooves in the friction lining 25 are then used to form or enlarge the channels 31 to 34. Although not illustrated, the channels 31 to 34 can run in an almost arbitrary manner. In this case, however, it is advantageous if the channels 31 to 34 are distributed substantially uniformly over the frictional surface 30.

In the case of the frictional piece 41 illustrated in FIG. 3, the channels 31 to 34 are combined with the stamped pattern 15 of the friction lining 5. Consequently, the through holes 11 to 13 are doubly connected fluidically to each other.

On the one hand, the through holes 11 to 13 are connected fluidically to each other by the grooves 16 to 18 of the stamped pattern 15. In addition, the through holes 11 to 13 are connected fluidically to each other by the channels 31 to 34. The cooling effect is thereby optimized.

Figure 4:
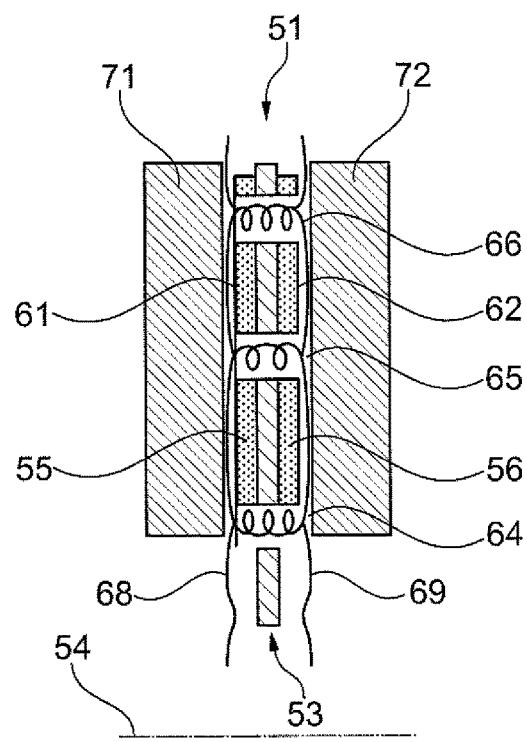
FIG. 4 shows a frictionally engaging device having a frictional piece between two pressure plates in an open state in a half section.
Figure 5:
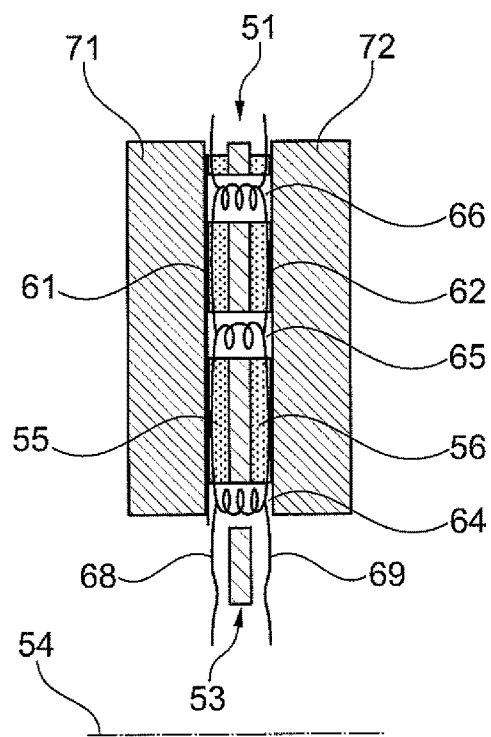
FIG. 5 shows the frictionally engaging device from FIG. 4 in the closed state.

A frictional piece 51 having a lining support 53 is illustrated in FIGS. 4 and 5. The lining support 53 has substantially the shape of a circular-ring disk, which can be rotated about an axis of rotation 54. The frictional piece 51 is illustrated in half section in FIGS. 4 and 5.

Two friction linings 55, 56 are secured on the lining support 53. The friction linings 55 and 56 have substantially the shape of circular-ring disks and are adhesively bonded to the lining support 53.

The friction linings 55, 56 have two frictional surfaces 61, 62, which face away from each other. The frictional piece 51 includes through holes 64, 65, 66, which extend between the frictional surfaces 61, 62 both through the friction linings 55, 56 and through the lining support 53.

In FIGS. 4 and 5, the frictional piece 51 is arranged between two pressure plates 71, 72. The pressure plates 71, 72 are two steel plates of the multiplate clutch described above, for example.

In FIG. 4, the clutch, in particular a multiplate clutch, with the pressure plates or steel plates 71, 72 is open. In the open state, the pressure plates 71, 72 are at a distance from the frictional surfaces 61, 62.

In FIG. 5, the multiplate clutch is closed. In the closed state of the multiplate clutch, the pressure plates 71, 72 or steel plates 71, 72 are frictionally connected to the frictional surfaces 61, 62 of the friction linings 55, 56.

In FIGS. 4 and 5, lines 68, 69 indicate how fluid circulates in and between the through holes 64 to 66 both in the open state (FIG. 4) and in the closed state (FIG. 5) of the multiplate clutch. In this case, a fluid flow preferably takes place from radially on the inside to radially on the outside during the operation of the multiplate clutch.

REFERENCE LABELS 1 frictional piece
3 lining support
4 internal toothing
5 friction lining
10 frictional surface
11 through hole
12 through hole
13 through hole
15 stamped pattern
16 groove
17 groove
18 groove
21 frictional piece
25 friction lining
30 frictional surface
31 channel
32 channel
33 channel
34 channel
41 frictional piece
51 frictional piece 53 lining support
54 axis of rotation
55 friction lining
56 friction lining
61 frictional surface
62 frictional surface
64 through hole
65 through hole
66 through hole
68 line
69 line
7 pressure plate
72 pressure plate

The invention claimed is:

1. A frictional piece for a wet frictionally engaging device comprising:
an axis of rotation;
a lining support rotatable about the axis of rotation;
a pair of friction linings mounted on the lining support, the friction linings including respective frictional surfaces that face away from each other, and;
a plurality of through holes extending through the friction linings and the lining support between the frictional surfaces.

2. The frictional piece of claim 1, further comprising a plurality of channels each fluidically connecting at least two of the plurality of through holes.

3. The frictional piece of claim 2 wherein each of the plurality of channels is at least partially formed by a groove in a friction lining of the pair of friction linings.

4. The frictional piece of claim 2 wherein each of the plurality of channels is at least partially formed by a groove in the lining support.

5. The frictional piece of claim 2 further comprising a fluid inlet or a fluid outlet, wherein at least one through hole of the plurality of through holes is connected to the fluid inlet or the fluid outlet.

6. The frictional piece of claim 2, wherein the plurality of through holes is distributed uniformly over the frictional surfaces.

7. The frictional piece as claimed in claim 2, wherein each through hole of the plurality of through holes extends in an axial direction through the friction linings and the lining support.

8. The frictional piece as claimed in claim 2, wherein each of the pair of friction linings is in the shape of a circular ring disk.

9. A frictional piece for a wet frictionally engaging device comprising:
an axis of rotation;
a lining support rotatable about the axis of rotation;
a pair of friction linings mounted on the lining support, the friction linings including respective frictional surfaces that face away from each other;
a plurality of through holes extending through the friction linings and the lining support between the frictional surfaces; and
a plurality of channels each fluidically connecting at least two of the plurality of through holes, wherein each of the plurality of channels is at least partially formed by a groove pressed in a friction lining of the pair of friction linings.

10. The frictional piece of claim 9 further comprising a fluid inlet or a fluid outlet, wherein at least one through hole of the plurality of through holes is connected to the fluid inlet or the fluid outlet.

11. The frictional piece of claim 9 further comprising a fluid inlet or a fluid outlet, wherein at least one through hole of the plurality of through holes is connected to the fluid inlet or the fluid outlet.

12. The frictional piece of claim 9, wherein the plurality of through holes is distributed uniformly over the frictional surfaces.

13. The frictional piece as claimed in claim 9, wherein each through hole of the plurality of through holes is drilled or punched through the pair of friction linings and the lining support.

14. The frictional piece as claimed in claim 9, wherein each of the pair of friction linings is in the shape of a circular ring disk and at least a portion of at least one of the plurality of through holes is disposed at least partially radially inside or radially outside of the circular ring disk.

15. A frictional piece for a wet frictionally engaging device comprising:
an axis of rotation;
a lining support rotatable about the axis of rotation;
a pair of friction linings mounted on the lining support, the friction linings including respective frictional surfaces that face away from each other;
a plurality of through holes extending through the friction linings and the lining support between the frictional surfaces; and
a plurality of channels each fluidically connecting at least two of the plurality of through holes, wherein each of the plurality of channels is at least partially formed by a groove stamped in the lining support.

16. The frictional piece of claim 15 further comprising a fluid inlet or a fluid outlet, wherein at least one through hole of the plurality of through holes is connected to the fluid inlet or the fluid outlet.

17. The frictional piece of claim 15 further comprising a fluid inlet or a fluid outlet, wherein at least one through hole of the plurality of through holes is connected to the fluid inlet or the fluid outlet.

18. The frictional piece of claim 15, wherein the plurality of through holes is distributed uniformly over the frictional surfaces.

19. The frictional piece as claimed in claim 15, wherein each through hole of the plurality of through holes is drilled or punched through the pair of friction linings and the lining support.

20. The frictional piece as claimed in claim 15, wherein each of the pair of friction linings is in the shape of a circular ring disk and at least a portion of at least one of the plurality of through holes is disposed at least partially radially inside or radially outside of the circular ring disk.

* * * * *